United States Patent
Kikkawa et al.

(10) Patent No.: US 10,189,740 B2
(45) Date of Patent: Jan. 29, 2019

(54) OPTICAL GLASS, PREFORM, AND OPTICAL ELEMENT

(71) Applicant: OHARA INC., Sagamihara-shi, Kanagawa (JP)

(72) Inventors: Ken Kikkawa, Sagamihara (JP); Atsushi Nagaoka, Sagamihara (JP)

(73) Assignee: OHARA INC., Kanagawa (JP)

( * ) Notice: Subject to any disclaimer, the term of this patent is extended or adjusted under 35 U.S.C. 154(b) by 0 days.

(21) Appl. No.: 15/342,392

(22) Filed: Nov. 3, 2016

(65) Prior Publication Data

US 2017/0129801 A1 May 11, 2017

(30) Foreign Application Priority Data

Nov. 6, 2015 (JP) .................... 2015-218903

(51) Int. Cl.
- *C03C 3/097* (2006.01)
- *G02B 27/00* (2006.01)
- *C03C 3/089* (2006.01)

(52) U.S. Cl.
CPC .............. *C03C 3/097* (2013.01); *C03C 3/089* (2013.01); *G02B 27/0025* (2013.01); *G02B 27/0062* (2013.01)

(58) Field of Classification Search
CPC .................................................. C03C 3/097
See application file for complete search history.

(56) References Cited

U.S. PATENT DOCUMENTS

| | | | | |
|---|---|---|---|---|
| 4,562,161 | A | * | 12/1985 | Mennemann ........... C03C 3/091 501/58 |
| 5,952,256 | A | * | 9/1999 | Morishita ............... C03C 3/064 501/63 |
| 6,333,288 | B1 | | 12/2001 | Clement et al. |
| 6,703,333 | B2 | | 3/2004 | Uehara |

(Continued)

FOREIGN PATENT DOCUMENTS

| | | |
|---|---|---|
| CN | 105948482 A | 9/2016 |
| GB | 2342918 A | 4/2000 |

(Continued)

OTHER PUBLICATIONS

U.S. Non-Final Office Action for corresponding U.S. Appl. No. 15/347,185 dated Jul. 12, 2017.

(Continued)

*Primary Examiner* — Noah S Wiese

(74) *Attorney, Agent, or Firm* — Cantor Colburn LLP

(57) ABSTRACT

An optical glass having a small partial dispersion ratio ($\theta g, F$), while having a refractive index ($n_d$) and Abbe number ($v_d$) within desired ranges, is obtained. The optical glass, in mol %, comprises 20.0 to 65.0% of an $SiO_2$ component, 1.0 to 25.0% of an $Nb_2O_5$ component, and 1.0 to 35.0% of an $Na_2O$ component, and has a refractive index ($n_d$) of 1.62 to 1.75, an Abbe number ($v_d$) of 30 to 42, and a partial dispersion ratio ($\theta g, F$) of no greater than 0.594.

11 Claims, 3 Drawing Sheets

(56) References Cited

U.S. PATENT DOCUMENTS

| | | |
|---|---|---|
| 7,087,542 B2 | 8/2006 | Uehara |
| 7,598,192 B2 | 10/2009 | Wolff et al. |
| 7,977,264 B2 * | 7/2011 | Wolff .................. C03C 3/064 501/63 |
| 7,999,398 B2 | 8/2011 | Ohtsuka et al. |
| 2004/0033880 A1 | 2/2004 | Naumann et al. |
| 2007/0149381 A1 | 6/2007 | Wolff et al. |
| 2008/0029780 A1 | 2/2008 | Ohtsuka et al. |
| 2008/0300125 A1 | 12/2008 | Wolff et al. |
| 2013/0172168 A1 * | 7/2013 | Sato .................. C03C 3/062 501/63 |
| 2017/0129801 A1 | 5/2017 | Kikkawa et al. |
| 2017/0129802 A1 | 5/2017 | Kikkawa et al. |

FOREIGN PATENT DOCUMENTS

| | | |
|---|---|---|
| GB | 2342918 B | 4/2001 |
| JP | 2000128568 A | 5/2000 |
| JP | 2000344542 A | 12/2000 |
| JP | 2002029773 A | 1/2002 |
| JP | 2002029777 A | 1/2002 |
| JP | 2005139023 A | 6/2005 |
| JP | 2008239478 A | 10/2008 |
| JP | 2008288543 A | 11/2008 |
| WO | 0172650 A1 | 10/2001 |
| WO | 0214235 A1 | 2/2002 |

OTHER PUBLICATIONS

USPTO Final Office Action corresponding to U.S. Appl. No. 15/347,185, dated Nov. 7, 2017.
USPTO Non-Final Office Action corresponding to U.S. Appl. No. 15/347,185, dated Mar. 19, 2018.
USPTO Final Office Action corresponding to U.S. Appl. No. 15/787,057; dated Nov. 2, 2018.
USPTO Final Office Action corresponding to U.S. Appl. No. 15/347,185; dated Jul. 27, 2018.
USPTO Final Office Action corresponding to U.S. Appl. No. 15/787,057; dated Jul. 24, 2018.

* cited by examiner

OPTICAL GLASS, PREFORM, AND OPTICAL ELEMENT

CROSS REFERENCE TO RELATED APPLICATIONS

This application is based on and claims the benefit of priority from Japanese Patent Application No. 2015-218903 filed on Nov. 6, 2015, the contents of which are incorporated herein by reference.

BACKGROUND OF THE INVENTION

Field of the Invention

The present invention relates to an optical glass, a preform, and an optical element.

Related Art

Optical systems such as digital cameras and video cameras and the like, to varying degrees have blurring referred to as aberrations. These aberrations are classified as monochromatic aberrations and chromatic aberrations, and in particular, chromatic aberrations are strongly dependent on the material characteristics of the lenses used in the optical system.

Generally, chromatic aberrations are corrected by combining low dispersion convex lenses with high dispersion concave lenses, but these combinations can only correct aberrations in the red region and green region, while aberrations in the blue region remain. These aberrations in the blue region which cannot be eliminated are referred to as secondary spectra. In order to correct these secondary spectra, it is necessary to carry out optical design which takes into account shifts in the g-line (435.835 nm) of the blue region. At this time, as an indicator of the optical characteristics which are noted during the optical design, the partial dispersion ratio ($\theta g,F$) is used. In the above described optical system combining low dispersion lenses and high dispersion lenses, by using an optical material having a large partial dispersion ratio ($\theta g,F$) at the low dispersion lens side, and an optical material having a small partial dispersion ratio ($\theta g,F$) at the high dispersion lens side, secondary spectra can be well corrected.

The partial dispersion ratio ($\theta g,F$) is shown by the below formula (1).

$$\theta g, F = (ng - nF)/(nF - nc) \quad (1)$$

In optical glasses, there is an approximately linear relationship between the partial dispersion ratio ($\theta g,F$) which shows the partial dispersion properties in the short wavelength range, and the Abbe number (vd). The straight line which shows this relationship, shown by a straight line connecting two points when plotting the partial dispersion ratio and the Abbe number of NSL7 and PBM2 in a Cartesian coordinate system where the partial dispersion ratio ($\theta g,F$) is the ordinate and the Abbe number (vd) is the abscissa, is referred to as the normal line (refer to FIG. 1). Normal glasses which are the standards of the normal line differ among different optical glass manufacturers, but this is defined by each manufacturer according to approximately equal slopes and intercepts. (NSL7 and PBM2 are optical glasses manufactured by Ohara, Inc., and PBM2 has an Abbe number (vd) of 36.3 and a partial dispersion ratio ($\theta g,F$) of 0.5828, and NSL7 has an Abbe number (vd) of 60.5 and a partial dispersion ratio ($\theta g,F$) of 0.5436.

Herein, as glasses having an Abbe number (vd) of 30 to 42, for example, the optical glasses according to Patent Documents 1 and 2 are known.

Patent Document 1: Japanese Unexamined Patent Application, Publication No. 2002-029777
Patent Document 2: Japanese Unexamined Patent Application, Publication No. 2008-239478

SUMMARY OF THE INVENTION

However, the glass disclosed in Patent Document 1 has a partial dispersion ratio which is not small, and is not sufficient for use as a lens for correcting the above mentioned secondary spectra. Further, the glass disclosed in Patent Document 2, while having a relatively small partial dispersion ratio, has a large Abbe number, and there is demand for a glass with a smaller Abbe number.

The present invention was made in consideration of the above described problems, and has the objective of providing an optical glass with a small partial dispersion ratio ($\theta g,F$) while having a refractive index (nd) and an Abbe number (vd) within the desired ranges.

The present inventors, as a result of repeated diligent experimentation and research to solve the above described problems, discovered that a glass having a low partial dispersion ratio, and a high refractive index and low Abbe number (high dispersion) within the desired ranges can be provided by a glass comprising an SiO2 component and an Nb2O5 component, and thus completed the present invention.

Specifically, the present invention provides the following.

The first aspect of the present invention is an optical glass comprising, in mol %,
20.0 to 65.0% of an SiO2 component,
1.0 to 25.0% of an Nb2O5 component,
1.0 to 35.0% of an Na2O component,
and having
a refractive index (nd) of 1.62 to 1.75,
an Abbe number (vd) of 30 to 42, and
a partial dispersion ratio ($\theta g,F$) of no greater than 0.594.

The second aspect of the present invention is an optical glass according to the first aspect, wherein a sum (in mol %) of (SiO2+Nb2O5+Li2O) is 25.0% to 70.0%.

The third aspect of the present invention is an optical glass according to the first or second aspect, wherein, in mol %,
a B2O3 component is 0 to 30.0%, and
a ZrO2 component is 0 to 20.0%.

The fourth aspect of the present invention is an optical glass according to any one of the first to third aspects, wherein, in mol %,
an Li2O component is 0 to 20.0%,
a TiO2 component is 0 to 15.0%,
a K2O component is 0 to 10.0%,
an MgO component is 0 to 10.0%,
a CaO component is 0 to 15.0%,
an SrO component is 0 to 15.0%,
a BaO component is 0 to 25.0%,
an La2O3 component is 0 to 15.0%,
a Gd2O3 component is 0 to 10.0%,
a Y2O3 component is 0 to 20.0%,
a Yb2O3 component is 0 to 10.0%,
a P2O5 component is 0 to 10.0%,
a GeO2 component is 0 to 10.0%,
an Al2O3 component is 0 to 15.0%,
a Ga2O3 component is 0 to 10.0%,
a Ta2O5 component is 0 to 10.0%,
a WO3 component is 0 to 10.0%,
a Bi2O3 component is 0 to 10.0%,
a ZnO component is 0 to 20.0%,
a TeO2 component is 0 to 10.0%, an SnO2 component is 0 to 5.0%, and
an Sb2O3 component is 0 to 1.0%.

The fifth aspect of the present invention is an optical glass according to any one of the first to fourth aspects, wherein a mol ratio (SiO2)/(SiO2+B2O3) is less than 0.95.

The sixth aspect of the present invention is an optical glass according to any one of the first to fifth aspects, wherein a sum (in mol %) of an Rn2O component (in the formula, Rn is at least one selected from the group consisting of Li, Na, and K) is 5.0% to 40.0%.

The seventh aspect of the present invention is an optical glass according to any one of the first to sixth aspects, wherein a sum (in mol %) of an RO component (in the formula, R is at least one selected from the group consisting of Mg, Ca, Sr, and Ba) is no greater than 25.0%, and a sum (in mol %) of an Ln2O3 component (in the formula, Ln is at least one selected from the group consisting of Y, La, Gd, and Yb) is no greater than 20.0%.

The eighth aspect of the present invention is an optical glass according to any one of the first to seventh aspects, wherein a mol ratio of (Li2O+Na2O)/(Rn2O) is no less than 0.75.

The ninth aspect of the present invention is an optical glass according to any one of the first to eighth aspects, wherein the refractive index (nd) is 1.62 to 1.74, and the Abbe number (vd) is 30 to 40.

The tenth aspect of the present invention is a preform for use in a polishing process or precision press molding, consisting of the optical glass of any one of the first to ninth aspects.

The eleventh aspect of the present invention is an optical element consisting of the optical glass according to any one of the first to ninth aspects.

According to the present invention, it is possible to obtain an optical glass having a small partial dispersion ratio (θg,F), while having a refractive index (nd) and Abbe number (vd) within the desired ranges.

Further, according to the present invention, because devitrification when reheating the glass is reduced, it is possible to obtain an optical glass suitable for reheat press molding.

DETAILED DESCRIPTION OF THE INVENTION

Figure 1:
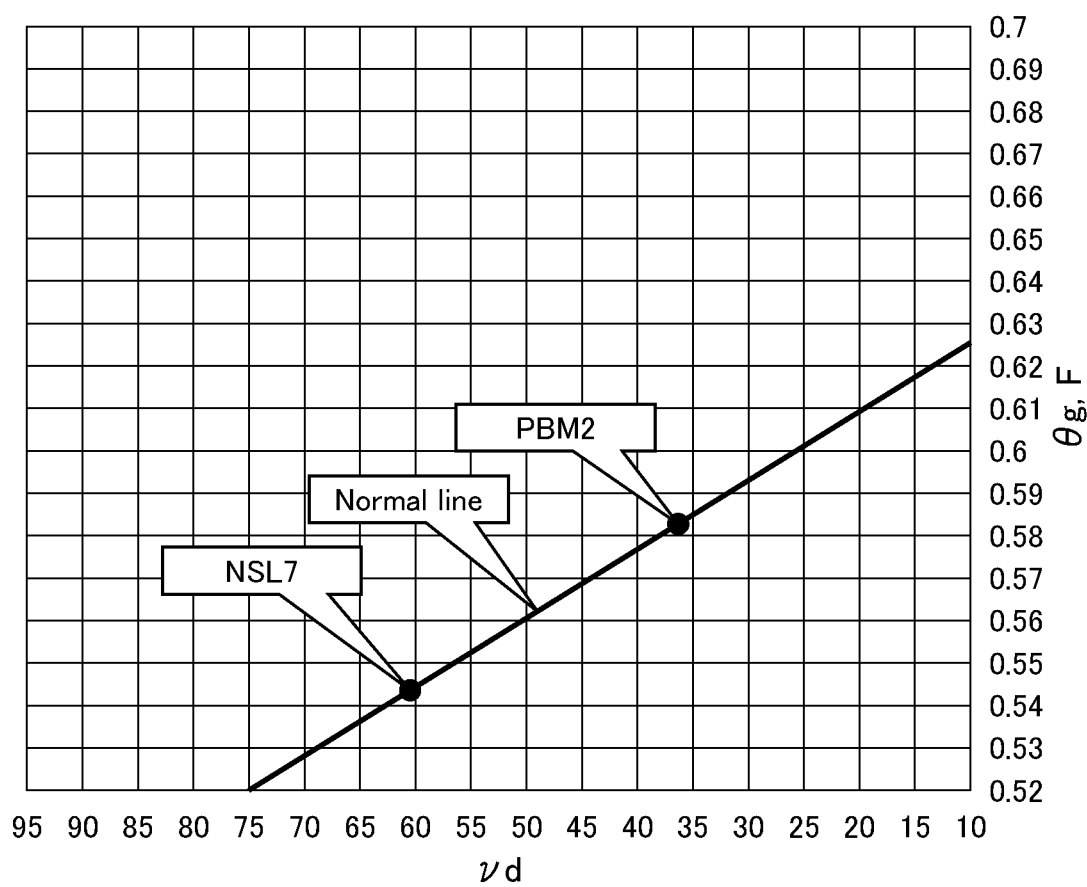
FIG. 1 is a drawing showing the normal line in Cartesian coordinates with the partial dispersion ratio (θg,F) as the ordinate and the Abbe number (vd) as the abscissa.

The optical glass of the present invention comprises, in mol %, a SiO2 component of 20.0 to 65.0%, an Nb2O5 component of 1.0 to 25.0%, and an Na2O component of 1.0 to 35.0%, and has a refractive index (nd) of 1.62 to 1.75, an Abbe number (vd) of 30 to 42, and a partial dispersion ratio (θg,F) of no greater than 0.594.

In a glass comprising an SiO2 component and an Nb2O5 component, it is possible to obtain a glass having a low partial dispersion ratio, as well as a high refractive index and a low Abbe number (high dispersion) within the desired ranges.

Therefore, it is possible to obtain an optical glass useful for reducing chromatic aberrations in optical systems with a small partial dispersion ratio (θg,F), while having a desired high refractive index (nd) and low Abbe number (vd).

In addition, because devitrification upon reheating the glass is reduced, it is possible to obtain an optical glass suitable for reheat press molding.

Further, it is also possible to obtain an optical glass which has a low specific gravity and can therefore contribute to reducing the weight of an optical instrument, and further, which has a low glass transition point and therefore makes it possible to lower the heating temperature when reheat press molding.

Below, embodiments of the optical glass of the present invention are explained in detail, but the present invention is not in any way limited by the below examples, and may be practiced with the addition of suitable modifications within the scope of the objective of the present invention. Further, in portions where the explanations overlap, explanations may be suitably omitted, but this does not limit the gist of the present invention.

[Glass Components]

The compositional ranges of each of the components constituting the optical glass of the present invention are described below. Unless otherwise stated, in the present specification, the content of each component is expressed in mol % with respect to the total mol number of the glass in an oxide content basis. Herein, the "oxide content basis" is a composition where, assuming that the oxides, complex salts, metal fluorides and the like used as raw materials of the constituent components of the glass of the present invention have all been decomposed and converted to oxides when melting the raw materials, each component contained in the glass is stated with the total mol number of these oxides as 100 mol %.

<Concerning the Essential Components and Optional Components>

The SiO2 component is an essential component which stimulates the formation of a stable glass, and reduces devitrification (generation of crystals) which is unfavorable for an optical glass.

In particular, by making the content of the SiO2 component no less than 20.0%, it is possible to reduce devitrification without greatly increasing the partial dispersion ratio. Further, in this way it is possible to reduce devitrification and coloring when reheating. Accordingly, the content of the SiO2 component is preferably no less than 20.0%, more preferably greater than 30.0%, even more preferably greater than 35.0%, even more preferably greater than 40.0%, even more preferably greater than 43.0%, and even more preferably greater than 45.0%.

On the other hand, by making the content of the SiO2 component no greater than 65.0%, reduction of the refractive index is impeded, whereby a desired high refractive index can be readily obtained, and further, increases in the partial dispersion ratio can be restrained. Further, in this way a degradation of the melting properties of the glass raw materials can be restrained. Accordingly, the content of the SiO2 component is preferably 65.0% or less, more preferably less than 60.0%, even more preferably less than 58.0%, and even more preferably less than 55.0%.

As a raw material for the SiO2 component, SiO2, K2SiF6, Na2SiF6 and the like may be used.

The Nb2O5 component is an essential component and by making its content no less than 1.0%, it is possible to increase the refractive index, and lower the Abbe number and partial dispersion ratio of the glass. Accordingly, the content of the $Nb_2O_5$ component is preferably no less than 1.0%, more preferably greater than 3.0%, even more preferably greater than 5.0%, and even more preferably greater than 7.0%.

On the other hand, by making the content of the $Nb_2O_5$ component no greater than 25.0%, it is possible to reduce the material cost of the glass. Further, it is possible to suppress an increase in the melting temperature when manufacturing the glass, and it is further possible to reduce the devitrification due to an excessive content of the $Nb_2O_5$ component. Accordingly, the content of the $Nb_2O_5$ component is preferably no greater than 25.0%, more preferably less than 20.0%, even more preferably less than 15.0%, even more preferably less than 11.0%, and even more preferably less than 10.0%.

As a raw material for the $Nb_2O_5$ component, $Nb_2O_5$ and the like may be used.

The $Na_2O$ component is an essential component and by making its content no less than 1.0%, it is possible to reduce the partial dispersion ratio of the glass, to enhance the reheat press properties of the glass, the glass transition point can be lowered, and further, the melting properties of the glass raw materials can be enhanced. Accordingly, the content of the $Na_2O$ component is preferably no less than 1.0%, more preferably greater than 5.0%, even more preferably greater than 8.0%, even more preferably greater than 11.0%, even more preferably greater than 13.0%, and even more preferably greater than 15.0%.

On the other hand, by making the content of the $Na_2O$ component no greater than 35.0%, it is possible to restrain reductions in the refractive index of the glass, deterioration of the chemical resistance of the glass can be impeded, and further, devitrification due to an excessive content can be reduced.

Accordingly, the content of the $Na_2O$ component is preferably no greater than 35.0%, more preferably less than 30.0%, even more preferably less than 25.0%, and even more preferably less than 23.0%.

As a raw material for the $Na_2O$ component, $Na_2CO_3$, $NaNO_3$, $NaF$, $Na_2SiF_6$ and the like may be used.

The total amount (in mol %) of the $SiO_2$ component, the $Nb_2O_5$ component, and the $Li_2O$ component is preferably 25% to 70%.

In particular, by making this total amount no less than 25.0%, the reheat press properties of the glass are enhanced. Accordingly, the sum (in mol %) of ($SiO_2+Nb_2O_5+Li_2O$) is preferably no less than 25.0%, more preferably greater than 30.0%, even more preferably greater than 40.0%, even more preferably greater than 50.0%, even more preferably greater than 54.0%, and even more preferably greater than 58.05%.

On the other hand, by making this total amount no greater than 70.0%, it is possible to reduce devitrification of the glass. Accordingly, the sum (in mol %) of ($SiO_2+Nb_2O_5+Li_2O$) preferably has an upper limit of 70.0%, more preferably 68.0%, and even more preferably 65.0%.

The $B_2O_3$ component is an optional component, which when having a content exceeding 0%, can promote stable glass formation and reduce devitrification, and further can enhance the melting properties of the glass raw materials. Accordingly, the content of the $B_2O_3$ component preferably exceeds 0%, more preferably exceeds 1.0%, even more preferably exceeds 2.0%, even more preferably exceeds 4.0%, even more preferably exceeds 6.0%, even more preferably exceeds 7.0%, even more preferably exceeds 10.0%, and even more preferably exceeds 12.0%.

On the other hand, by making the content of the $B_2O_3$ component no greater than 30.0%, it is possible to restrain reductions in the refractive index and increases in the Abbe number, and it is further possible to restrain increases in the partial dispersion ratio. Accordingly, the content of the $B_2O_3$ component is preferably no greater than 30.0%, more preferably less than 25.0%, even more preferably less than 20.0%, and even more preferably less than 18.0%.

As the raw material of the $B_2O_3$ component, $H_3BO_3$, $Na_2B_4O_7$, $Na_2B_4O_7 \cdot 10H_2O$, $BPO_4$ and the like may be used.

The $ZrO_2$ component is an optional component, which when having a content exceeding 0%, can increase the refractive index of the glass, lower the Abbe number, lower the partial dispersion ratio, and further can reduce devitrification. Further, in this way it is possible to reduce devitrification and coloring when reheating. Accordingly, the content of the $ZrO_2$ component preferably exceeds 0%, more preferably exceeds 0.5%, even more preferably exceeds 1.0%, even more preferably exceeds 3.0%, and even more preferably exceeds 5.0%.

On the other hand, by making the content of the $ZrO_2$ component no greater than 20.0%, it is possible to reduce devitrification, and it further becomes easy to obtain a more homogeneous glass.

Accordingly, the content of the $ZrO_2$ component is preferably no greater than 20.0%, more preferably less than 15.0%, even more preferably less than 12.0%, even more preferably less than 10.0%, and even more preferably less than 9.0%.

As the raw material of the $ZrO_2$ component, $ZrO_2$, $ZrF_4$ and the like may be used.

The $Li_2O$ component is an optional component, which when having a content exceeding 0%, can lower the partial dispersion ratio of the glass, enhance the reheat press properties, can lower the glass transition point, and further enhances the melting properties of the glass raw materials. Accordingly, the content of the $Li_2O$ component preferably exceeds 0%, more preferably exceeds 0.3%, and even more preferably exceeds 0.5%.

On the other hand, by making the content of the $Li_2O$ component no greater than 20.0%, it is possible to restrain reductions in the refractive index, deterioration of the chemical resistance can be impeded, and it is further possible to reduce devitrification due to an excessive content.

Accordingly, the content of the $Li_2O$ component is preferably no greater than 20.0%, more preferably less than 15.0%, even more preferably less than 12.0%, and even more preferably less than 10.0%.

As the raw material of the $Li_2O$ component, $Li_2CO_3$, $LiNO_3$, $LiF$ and the like may be used.

The $TiO_2$ component is an optional component, which when having a content exceeding 0%, can increase the refractive index, lower the Abbe number, and can further reduce devitrification.

On the other hand, by making the content of the $TiO_2$ component no greater than 15.0%, it is possible to reduce coloring of the glass, and the internal transmittance is increased. Further, in this way increases in the partial dispersion ratio are impeded, whereby the desired low partial dispersion ratio can be easily obtained. Accordingly, the content of the $TiO_2$ component is preferably no greater than 15.0%, more preferably less than 12.0%, even more preferably less than 10.0%, even more preferably less than 5.0%, and even more preferably less than 3.0%.

As the raw material of the $TiO_2$ component, $TiO_2$ and the like may be used.

The $K_2O$ component is an optional component, which when having a content exceeding 0%, reduces the refractive index, enhances the melting properties of the glass raw materials, and can further lower the glass transition point.

On the other hand, by making the content of the K2O component no greater than 10.0%, it is possible to restrain increases in the partial dispersion ratio, devitrification can be reduced, and further, deterioration of the chemical resistance can be impeded. Further, it is possible to restrain degradation of the reheat press molding properties. Accordingly, the content of the K2O component is preferably no greater than 10.0%, more preferably less than 5.0%, even more preferably less than 3.0%, even more preferably less than 1.50%, and even more preferably less than 0.5%.

As the raw material of the K2O component, K2CO3, KNO3, KF, KHF2, K2SiF6 and the like may be used.

The MgO component is an optional component, which when having a content exceeding 0%, can lower the melting temperature of the glass.

On the other hand, by making the content of the MgO component no greater than 10.0%, reductions in the refractive index and increases in the Abbe number are suppressed, while devitrification can be reduced. Accordingly, the content of the MgO component is preferably no greater than 10.0%, more preferably less than 5.0%, even more preferably less than 3.0%, and even more preferably less than 1.0%.

As the raw material of the MgO component, MgO, MgCO3, MgF2 and the like may be used.

The CaO component is an optional component, which when having a content exceeding 0%, reduces the material costs of the glass, while devitrification can be reduced, and further, the melting properties of the glass raw materials are enhanced.

On the other hand, by making the content of the CaO component no greater than 15.0%, reductions in the refractive index and increases in the Abbe number, as well as increases in the partial dispersion ratio are restrained, and further, devitrification can be reduced. Accordingly, the content of the CaO component is preferably no greater than 15.0%, more preferably less than 10.0%, even more preferably less than 5.0%, and even more preferably less than 2.5%.

As the raw material of the CaO component, CaCO3, CaF2 and the like may be used.

The SrO component is an optional component, which when having a content exceeding 0%, can reduce devitrification of the glass, and further increases the refractive index.

In particular, by making the content of the SrO component no greater than 15.0%, increases in the Abbe number are suppressed, and degradation of the chemical resistance is restrained. Accordingly, the content of the SrO component is preferably no greater than 15.0%, more preferably less than 10.0%, even more preferably less than 5.0%, even more preferably less than 3.0%, and even more preferably less than 1.0%.

As the raw material of the SrO component, Sr(NO3)2, SrF2 and the like may be used.

The BaO component is an optional component, which when having a content exceeding 0%, can reduce devitrification of the glass, and further, increases the refractive index, enhances the melting properties of the glass raw materials, and further, compared to other alkaline earth components, can reduce the material costs of the glass. Further, it is a component which restrains degradations in the reheat press molding properties.

On the other hand, by making the content of the BaO component no greater than 25.0%, increases in the Abbe number are suppressed, while degradations of the chemical resistance and devitrification are restrained. Accordingly, the content of the BaO component is preferably no greater than 25.0%, more preferably less than 15.0%, even more preferably less than 10.0%, and even more preferably less than 5.0%.

As the raw material of the BaO component, BaCO3, Ba(NO3)2 and the like may be used.

The La2O3 component, Gd2O3 component, Y2O3 component, and Yb2O3 component are optional components, which when at least one of them has a content exceeding 0%, can increase the refractive index, and further can reduce the partial dispersion ratio.

On the other hand, by making the content of the La2O3 component no greater than 15.0%, is it possible to restrain increases in the Abbe number, the specific gravity can be made small, and further, devitrification can be reduced. Accordingly, the content of the La2O3 component is preferably no greater than 15.0%, more preferably less than 10.0%, even more preferably less than 5.0%, even more preferably less than 3.0%, and even more preferably less than 1.0%.

Further, by making the content of the Y2O3 component no greater than 20.0%, increases in the Abbe number are restrained, the specific gravity can be made small, and devitrification can be reduced. Accordingly, the content of the Y2O3 component is preferably no greater than 20.0%, more preferably less than 10.0%, even more preferably less than 5.0%, and even more preferably less than 3.0%.

Further, by making the content of each of the Gd2O3 component and the Yb2O3 component no greater than 10.0%, increases in the Abbe number are restrained, the specific gravity can be made small, and devitrification can be reduced, and further material costs can be reduced. Accordingly, the content of each of the Gd2O3 component and the Yb2O3 component is preferably no greater than 10.0%, more preferably less than 5.0%, even more preferably less than 3.0%, and even more preferably less than 1.0%.

As the raw materials of the La2O3 component, Gd2O3 component, Y2O3 component, and the Yb2O3 component, La2O3, La(NO3)3.XH2O (X is an arbitrary integer), Y2O3, YF3, Gd2O3, GdF3, Yb2O3 and the like may be used.

The P2O5 component is an optional component, which when having a content exceeding 0%, can reduce devitrification of the glass.

On the other hand, by making the content of the P2O5 component no greater than 10.0%, it is possible to reduce devitrification due to an excessive content of the P2O5 component. Accordingly, the content of the P2O5 component is preferably no greater than 10.0%, more preferably less than 5.0%, even more preferably less than 3.0%, and even more preferably less than 1.0%.

As the raw material of the P2O5 component, Al(PO3)3, Ca(PO3)2, Ba(PO3)2, BPO4, H3PO4 and the like may be used.

The GeO2 component is an optional component, which when having a content exceeding 0%, increases the refractive index, and further can reduce devitrification.

On the other hand, by making the content of the GeO2 component no greater than 10.0%, because the used amount of expensive GeO2 is reduced, it is possible to reduce the material costs of the glass. Accordingly, the content of the GeO2 component is preferably no greater than 10.0%, more preferably less than 5.0%, and even more preferably less than 1.0%.

As the raw material of the GeO2 component, GeO2 and the like may be used.

The Al2O3 component and Ga2O3 component are optional components, which when at least one of them has a content exceeding 0%, increase the chemical resistance, and further can reduce devitrification of the glass.

On the other hand, by making the content of the Al2O3 component no greater than 15.0%, it is possible to reduce devitrification due to excessive content. Accordingly, the content of the Al2O3 component is preferably no greater than 15.0%, more preferably less than 8.0%, even more preferably less than 5.0%, and even more preferably less than 3.0%.

Further, by making the content of the Ga2O3 component no greater than 10.0%, it is possible to reduce devitrification due to excessive content. Accordingly, the content of the Ga2O3 component is preferably no greater than 10.0%, more preferably less than 5.0%, and even more preferably less than 3.0%.

As the raw materials of the Al2O3 component and Ga2O3 component, Al2O3, Al(OH)3, AlF3, Ga2O3, Ga(OH)3 and the like may be used.

The Ta2O5 component is an optional component, which when having a content exceeding 0%, increases the refractive index, lowers the partial dispersion ratio, and further, can reduce devitrification of the glass.

On the other hand, by making the content of the Ta2O5 component no greater than 10.0%, it is possible to reduce the amount of the Ta2O5 component which is a rare mineral resource, and further, because the glass readily melts at lower temperatures, the production costs of the glass can be reduced. Further, it is possible to reduce devitrification of the glass and increases in the Abbe number which are due to an excessive content of the Ta2O5 component. Accordingly, the content of the Ta2O5 component is preferably no greater than 10.0%, more preferably less than 5.0%, even more preferably less than 3.0%, and even more preferably less than 1.0%. In particular, from the viewpoint of reducing the material cost of the glass, the content of the Ta2O5 component may be made less than 0.1%.

As the raw material of the Ta2O5 component, Ta2O5 and the like may be used.

The WO3 component is an optional component, which when having a content exceeding 0%, increases the refractive index and reduces the Abbe number, and can reduce the devitrification of the glass, and further can enhance the melting properties of the raw materials of the glass.

On the other hand, by making the content of the WO3 component no greater than 10.0%, increases in the partial dispersion ratio of the glass can be impeded, and further, coloring of the glass is reduced and the internal transmittance is increased. Accordingly, the content of the WO3 component is preferably no greater than 10.0%, more preferably less than 5.0%, even more preferably less than 3.0%, and even more preferably less than 1.0%.

As the raw material of the WO3 component, WO3 and the like may be used.

The Bi2O3 component is an optional component, which when having a content exceeding 0%, can increase the refractive index and reduce the Abbe number, and further can lower the glass transition temperature.

On the other hand, by making the content of the Bi2O3 component no greater than 10.0%, increases in the partial dispersion ratio can be impeded, and further, coloring of the glass is reduced, and the internal transmittance can be increased. Accordingly, the content of the Bi2O3 component is preferably no greater than 10.0%, more preferably less than 5.0%, even more preferably less than 3.0%, and even more preferably less than 1.0%.

As the raw material of the Bi2O3 component, Bi2O3 and the like may be used.

The ZnO component is an optional component, which when having a content exceeding 0%, can reduce devitrification of the glass, reduces the partial dispersion ratio, and further lowers the glass transition temperature.

On the other hand, by making the content of the ZnO component no greater than 20.0%, the chemical resistance is increased, while reducing the devitrification and coloring when reheating the glass. Accordingly, the content of the ZnO component is preferably no greater than 20.0%, more preferably less than 10.0%, even more preferably less than 5.0%, and even more preferably less than 3.0%.

As the raw material of the ZnO component, ZnO, ZnF2 and the like may be used.

The TeO2 component is an optional component, which when having a content exceeding 0%, increases the refractive index, and can lower the partial dispersion ratio, and further can lower the glass transition temperature.

On the other hand, by making the content of the TeO2 component no greater than 10.0%, coloring of the glass is reduced and the internal transmittance is increased. Further, by reducing the use of the expensive TeO2 component, a glass can be obtained at a lower material cost. Accordingly, the content of the TeO2 component is preferably no greater than 10.0%, more preferably less than 5.0%, even more preferably less than 3.0%, and even more preferably less than 1.0%.

As the raw material of the TeO2 component, TeO2 and the like may be used.

The SnO2 component is an optional component, which when having a content exceeding 0%, can clarify (deaerate) the molten glass.

On the other hand, by making the content of the SnO2 component no greater than 5.0%, the occurrence of coloring of the glass due to reduction of the molten glass and devitrification of the glass can be impeded. Further, because it is possible to reduce the alloying of the SnO2 and the melting equipment (in particular precious metals such as Pt and the like), it is possible to plan a lengthening of the life of the melting equipment. Accordingly, the content of the SnO2 component is preferably no greater than 5.0%, more preferably less than 3.0%, and even more preferably less than 1.0%.

As the raw material of the SnO2 component, SnO, SnO2, SnF2, SnF4 and the like may be used.

The Sb2O3 component is an optional component, which when having a content exceeding 0%, can can clarify the glass.

On the other hand, by making the content of the Sb2O3 component no greater than 1.0%, the occurrence of excessive foaming is impeded when the glass is molten, and the alloying of the Sb2O3 component and the melting equipment (in particular precious metals such as Pt and the like) can be impeded. Accordingly, the content of the Sb2O3 component preferably has an upper limit of no greater than 1.0%, more preferably less than 0.5%, and even more preferably less than 0.1%. However, if environmental impact of the optical glass is considered, it is not necessary to include the Sb2O3 component.

As the raw material of the Sb2O3 component, Sb2O3, Sb2O5, Na2H2Sb2O7.5H2O and the like may be used.

Further, the component clarifying the glass is not limited to the above described Sb2O3 component, and well known clarifiers in the field of glass production, or combinations thereof may be used.

The ratio (mol ratio) of the content of the SiO2 component with respect to the total amount of the SiO2 component and the B2O3 component is preferably less than 0.95. In this way, it is possible to further enhance the reheat press molding properties of the glass. Accordingly, this (SiO2)/(SiO2+B2O3) mol ratio is preferably less than 0.95, more preferably less than 0.90, and even more preferably less than 0.85.

On the other hand, this (SiO2)/(SiO2+B2O3) mol ratio preferably has a lower limit of 0.30, more preferably 0.50, and even more preferably 0.60.

The sum (in mol %) of the content of the Rn2O component (where in the formula, Rn is at least one selected from the group consisting of Li, Na, and K) is preferably from 5.0% to 40.0%.

In particular, by making this sum no less than 5.0%, the melting properties of the glass raw materials are enhanced, and further, the glass transition point can be lowered. Therefore, the total content of the Rn2O component is preferably no less than 5.0%, more preferably greater than 10.0%, even more preferably greater than 15.0%, and even more preferably greater than 17.0%.

On the other hand, by making this sum no greater than 40.0%, reductions of the refractive index of the glass can be impeded, and devitrification when molding the glass can be reduced. Accordingly, the total content of the Rn2O component is preferably no greater than 40.0%, more preferably less than 35.0%, even more preferably less than 30.0%, and even more preferably less than 24.0%.

The sum (in mol %) of the content of the RO component (where in the formula, R is at least one selected from the group consisting of Mg, Ca, Sr, and Ba) is preferably no greater than 25.0%. In this way, increases in the Abbe number are restrained, and further, it is possible to reduce devitrification of the glass due to an excessive content of these components. Accordingly, the sum (in mol %) of the RO component is preferably no greater than 25.0%, more preferably less than 15.0%, even more preferably less than 10.0%, even more preferably less than 5.0%, and even more preferably less than 2.5%.

The sum (in mol %) of the content of the Ln2O3 component (where in the formula, Ln is at least one selected from the group consisting of La, Gd, Y, and Yb) is preferably no greater than 20.0%. In this way, it is possible to reduce devitrification of the glass, increases in the Abbe number can be restrained, and further, the material costs can be reduced. Accordingly, the sum (in mol %) of the Ln2O3 component is preferably no greater than 20.0%, more preferably less than 15.0%, even more preferably less than 10.0%, even more preferably less than 7.0%, even more preferably less than 5.0%, even more preferably less than 3.0%, and even more preferably less than 1.0%.

The ratio of the total amount of the Li2O component and the Na2O component with respect to the total amount of the Rn2O component (where in the formula, Rn is at least one selected from the group consisting of Li, Na, and K) is preferably no less than 0.75. In this way, the reheat press molding properties of the glass can be further enhanced. Accordingly, this (Li2O+Na2O)/(Rn2O) mol ratio preferably has a lower limit of 0.75, more preferably 0.88, and even more preferably 0.96.

Further, the upper limit of this (Li2O+Na2O)/(Rn2O) mol ratio is set to 1.

<Concerning Components which should not be Included>

Next, explanations are given for components which should not be included, and components which are not unfavorable for inclusion in the optical glass of the present invention.

Other components may be added as necessary within a scope which does not harm the characteristics of the glass of the invention of the present application. However, other than Ti, Zr, Nb, W, La, Gd, Y, Yb, and Lu, transition metal components such as V, Cr, Mn, Fe, Co, Ni, Cu, Ag, Mo and the like, color the glass even when contained individually or in combinations in small amounts, and because they have the property of giving rise to absorption of specific wavelengths in the visible range, they are preferably substantially not included particularly in an optical glass used for wavelengths in the visible range.

Further, lead compounds such as PbO and the like, and arsenic compounds such as As2O3 and the like, are components which have a high environmental load, and therefore, they are substantially not included, namely, it is desired that they are not included at all except for inevitable impurities.

Further, in recent years there has been a tendency to abstain from the use of each of the components of Th, Cd, Tl, Os, Be and Se as harmful chemical materials, and provisions for environmental measures are required not only for the production steps of the glass, but also for the processing steps, and until the disposal after the product has been made. Accordingly, when considering the environmental impact, it is preferable that these are substantially not included.

[Production Method]

The optical glass of the present invention can be produced, for example, as follows. Namely, all of the components of the above described raw materials are uniformly mixed so as to have contents within the prescribed ranges, and the produced mixture is put into a platinum crucible, quartz crucible, or alumina crucible and after rough melting, is put into a gold crucible, platinum crucible, platinum alloy crucible, or iridium crucible, and after carrying out melting for 3 to 5 hrs in a temperature range of 1100 to 1400° C., stirring, homogenizing and defoaming and the like, the temperature is lowered to 1000 to 1400° C., and then the finishing stirring is carried out, stria are removed, and the glass is produced by casting into a mold and annealing.

At this time, it is preferable to use materials having enhanced melting properties as the glass raw materials. In this way, it becomes possible to melt at lower temperatures, and melt for a shorter time, whereby the productivity of the glass is increased, and the production costs can be reduced. Further, because volatilization of the components and reactions with the crucible or the like can be reduced, it is possible to easily obtain a glass with low coloring.

<Physical Properties>

The optical glass of the present invention has a high refractive index and an Abbe number within a prescribed range.

The refractive index (nd) of the optical glass of the present invention preferably has a lower limit of 1.62, more preferably 1.63, and even more preferably 1.64. The upper limit of this refractive index may preferably be 1.75, more preferably 1.74, even more preferably 1.72, even more preferably 1.70, and even more preferably 1.69.

The Abbe number (vd) of the optical glass of the present invention is preferably no greater than 42, more preferably no greater than 40, even more preferably no greater than 39, and even more preferably no greater than 38. On the other hand, the Abbe number (vd) of the optical glass of the present invention preferably has a lower limit of 30, more preferably 32, and even more preferably 34.

The optical glass of the present invention having such a refractive index and Abbe number is useful for optical design, and in particular even when designing for enhanced imaging characteristics, makes it possible to plan a size reduction of the optical system, and therefore, allows a wide freedom of optical design.

Herein, the refractive index (nd) and the Abbe number (vd) of the optical glass of the present invention preferably satisfy the relationship $(-0.012vd+2.04) \leq nd \leq (-0.012vd+2.14)$. In the glass composition specified by the present invention, when the refractive index (nd) and the Abbe number (vd) satisfy this relationship, a glass where the occurrence of devitrification is further impeded can be obtained.

Accordingly, in the optical glass of the present invention, the refractive index (nd) and the Abbe number (vd) preferably satisfy the relationship $nd \geq (-0.012vd+2.04)$, more preferably satisfy the relationship $nd \geq (-0.012vd+2.05)$, and even more preferably satisfy the relationship $nd (-0.012vd+2.06)$.

On the other hand, in the optical glass of the present invention, the refractive index (nd) and the Abbe number (vd) preferably satisfy the relationship $nd \leq (-0.012vd+2.14)$, more preferably satisfy the relationship $nd \leq (-0.012vd+2.13)$, and even more preferably satisfy the relationship $nd (-0.012vd+2.12)$.

The optical glass of the present invention has a low partial dispersion ratio $(\theta g, F)$.

More specifically, the partial dispersion ratio $(\theta g, F)$ of the optical glass of the present invention preferably has an upper limit of 0.594, more preferably 0.590, and even more preferably 0.586. The lower limit of this partial dispersion ratio $(\theta g, F)$ is preferably 0.570, more preferably 0.573, and even more preferably 0.575.

Further, the partial dispersion ratio $(\theta g, F)$ of the optical glass of the present invention and the Abbe number (vd) preferably satisfy the relationship $(-0.00162 \times vd+0.630) \leq (\theta g, F) \leq (-0.00162 \times vd+0.652)$.

In this way, because it is possible to obtain an optical glass having a low partial dispersion ratio $(\theta g, F)$, an optical element formed from this optical glass is useful for reducing chromatic aberrations of an optical system.

Accordingly, in the optical glass of the present invention, the partial dispersion ratio $(\theta g, F)$ and the Abbe number (vd) preferably satisfy the relationship $\theta g, F \geq (-0.00162 \times vd+0.630)$, more preferably satisfy the relationship $\theta g, F \geq (-0.00162 \times vd+0.632)$, and even more preferably satisfy the relationship $\theta g, F \geq (-0.00162 \times vd+0.634)$.

On the other hand, in the optical glass of the present invention, the partial dispersion ratio $(\theta g, F)$ and the Abbe number (vd) preferably satisfy the relationship $\theta g, F \leq (-0.00162 \times vd+0.652)$, more preferably satisfy the relationship $\theta g, F \leq (-0.00162 \times vd+0.650)$, even more preferably satisfy the relationship $\theta g, F \leq (-0.00162 \times vd+0.648)$, even more preferably satisfy the relationship $\theta g, F \leq (-0.00162 \times vd+0.646)$, and even more preferably satisfy the relationship $\theta g, F \leq (-0.00162 \times vd+0.643)$.

Further, with the above relational formulas of the partial dispersion ratio $(\theta g, F)$ and the Abbe number (vd), by stipulating these relationships using a straight line with the same inclination as the normal line, it is shown that a glass having a smaller partial dispersion ratio $(\theta g, F)$ than a typical glass can be obtained.

The optical glass of the present invention preferably has a small specific gravity. More specifically, the specific gravity of the optical glass of the present invention is preferably no greater than 3.50 [g/cm3]. In this way, because the weight of the optical element and an optical device using the same can be reduced, this can contribute to optical devices with reduced weight. Accordingly, the specific gravity of the optical glass of the present invention preferably has an upper limit of 3.50, more preferably 3.30, and even more preferably 3.10. Further, the specific gravity of the optical glass of the present invention is often generally no less than 2.50, more specifically no less than 2.70, and even more specifically no less than 2.80.

The specific gravity of the optical glass of the present invention is measured based on the Japan Optical Glass Industrial Standard JOGIS 05-1975 "Measuring Method of Specific Gravity of Optical Glass".

The optical glass of the present invention preferably has a glass transition point of no greater than 650° C. In this way, because the glass softens at a lower temperature, it is possible to mold press mold the glass at a lower temperature. Further, the oxidation of the die used for the mold press molding is reduced and a long design life can be planned. Accordingly, the glass transition point of the optical glass of the present invention preferably has an upper limit of 650° C., more preferably 620° C., and even more preferably 600° C.

Further, the lower limit of the glass transition point of the optical glass of the present invention is not particularly limited, but the glass transition point of the optical glass of the present invention preferably has a lower limit of 460° C., more preferably 480° C., and even more preferably 500° C.

The optical glass of the present invention preferably has a yield point (At) of no greater than 700° C. The yield point, similarly to the glass transition point, is one indicator showing the softening properties of the glass, and is an indicator which shows a temperature close to the press molding temperature. Therefore, by using a glass with a yield point of no greater than 700° C., because it is possible to press mold at a lower temperature, it is possible to more easily carry out press molding. Accordingly, the yield point of the optical glass of the present invention preferably has an upper limit of 700° C., more preferably 680° C., and most preferably 660° C.

Further, the lower limit of the yield point of the optical glass of the present invention is not particularly limited, but the lower limit is preferably 500° C., more preferably 530° C., and even more preferably 560° C.

The optical glass of the present invention preferably has a small average coefficient of linear expansion (a). In particular, the upper limit of the average coefficient of linear expansion of the optical glass of the present invention is preferably $120 \times 10^{-7}$ K-1, more preferably $110 \times 10^{-7}$ K-1, and even preferably $100 \times 10^{-7}$ K-1. In this way, when press molding an optical glass with a molding die, the total amount of expansion and contraction due to temperature changes of the glass are reduced. Therefore, breakage of the optical glass when press molding can be impeded, and the productivity of the optical element can be increased.

The optical glass of the present invention is preferably one which has suitable reheat press molding properties. More specifically, in the optical glass of the present invention, devitrification and opacity preferably do not occur before or after reheating tests (drop tests). In this way, by impeding the occurrence of devitrification and coloring even in reheating tests which assume reheat press processing, because the loss of light transmittance of the glass is impeded, it become easy to carry out reheating processes represented by reheat press processing for the glass. Namely, because it is possible to manufacture optical elements of complex shapes by press molding, the production costs can be made inexpensive, and further, it is possible to implement optical element production with good productivity.

Herein, the reheating test (drop test) can be carried out by a method of mounting a 15 mm×15 mm×30 mm test piece on a concave refractory body and inserting it into an electric furnace and reheating, increasing the temperature from normal temperature over 150 min to a temperature which is 80° C. to 150° C. higher than the yield point (At) of each test piece (the temperature at which it collapses into the refractory body), and after holding at this temperature for 30 min, cooling to normal temperature and removing it from the furnace, polishing two opposing faces to a thickness of 10 mm so that the inner portion can be observed, after which the polished test piece is visually observed.

Further, the presence or absence of devitrification and opacity before and after the reheating test (drop test) can be confirmed for example by visual inspection, and "no occurrence of devitrification and opacity" indicates for example that the transmittance of a light beam (d line) with a wavelength of 587.56 nm for a test piece after the reheating test (drop test) divided by the transmittance of the d line of the test piece before the reheating test, has a value of roughly no less than 0.80.

The optical glass of the present invention preferably has a high chemical resistance. More specifically, the optical glass of the present invention preferably has a high water resistance and acid resistance. In this way, when carrying out the polishing process of the optical glass, because clouding of the glass due to a washing fluid and polishing fluid is reduced, the polishing process can be more easily carried out.

Further, the water resistance and acid resistance of the optical glass indicates that the chemical resistance (water resistance and acid resistance) is preferably grade 1 to 3, more preferably grade 1 to 2, and even more preferably grade 1 according to Japanese Optical Glass Industrial Standard "Method of Measuring Chemical Resistance of Optical Glass" JOGIS 06-2008.

The optical glass of the present invention is preferably one where the occurrence of devitrification when producing the glass is impeded. In this way, because reductions in the transmissivity due to crystallization and the like of the glass are restrained when producing the glass, it is possible to favorably use this optical glass for optical elements which transmit visible light such as lenses and the like. Further, as a gauge showing the degree of impeding the occurrence of devitrification when producing the glass, for example, a low liquid phase temperature can be mentioned.

[Preform and Optical Element]

A glass molded body can be produced from the produced optical glass, for example, using a mold press molding means such as reheat press molding or a precision press molding or the like. Namely, a preform for mold press molding is produced from the optical glass, and a glass molded body can be produced by carrying out reheat press molding of this preform and then carrying out a polishing process, or for example, a glass molded body can be produced by carrying out precision press molding on a preform which is produced by carrying out a polishing process. Further, the means for producing the glass molded body are not limited to these means.

A glass molded body produced in this way is useful for various optical elements, but among them, it is particularly suitable for use in applications of optical elements such as lenses or prisms, and the like. In this way, blurring of colors due to chromatic aberrations in the transmitted light of an optical system provided with the optical elements is reduced. Therefore, when these optical elements are used for a camera, the photographed objects can be more correctly represented, and when these optical elements are used for a projector, the desired image can be more brilliantly projected.

EXAMPLES

The compositions of Examples (No. 1 to No. 29) of the present invention, and the results for the refractive index (nd), the Abbe number (vd), partial dispersion ratio (θg,F), glass transition temperature (Tg), yield point (At), average coefficient of linear expansion (α), specific gravity, and reheating test (drop test) are shown in Tables 1 to 5. Further, the below examples are merely for the purpose of illustration, and the present invention is not in any way limited to these examples.

For the glasses of the examples, high purity raw materials usually used for optical glass such as oxides, hydroxides, carbonates, nitrates, fluorides, hydroxides, metaphosphoric acid compounds and the like respectively corresponding to each of the component raw materials were selected, weighed so as to attain the proportions of the compositions of each of the Examples and Comparative Examples shown in the tables and uniformly mixed, were then introduced into a platinum crucible, and depending on the degree of difficulty or ease of melting the glass raw materials, were melted in an electric furnace for 3 to 5 hours in a temperature range of 1100 to 1400° C., stirring, homogenizing and defoaming and the like were carried out, after which the temperature was reduced to 1000 to 1400° C., stirring and homogenizing were carried out, followed by casting into a mold, then annealing, and the glass was produced.

The refractive index (nd), Abbe number (vd), and partial dispersion ratio (θg,F) of the glasses of the examples were measured based on Japanese Optical Glass Industrial Standard JOGIS 01-2003.

Then, from the obtained values of the refractive index (nd) and Abbe number (vd), in the relation (nd=−a×vd+b), the intercept b for a slope a of 0.012 was obtained.

Further, from the obtained values of the Abbe number (vd) and the partial dispersion ratio (θg,F), in the relation (θg,F=−a'×vd+b'), the intercept b' for a slope a' of 0.00162 was obtained.

Further, the glasses used in the present measurements are ones for which the treatment was carried out in an annealing furnace at an annealing temperature reduction rate of −25° C./hr.

The glass transition temperature (Tg) and yield point (At) of the glasses of the examples were determined by the thermal expansion curve obtained by measuring the relationship between the temperature and the expansion of a test piece according to Japanese Optical Glass Industrial Standard JOGIS 08-2003, "Method of Measuring Thermal Expansion of an Optical Glass".

The average coefficient of linear expansion (a) of the glasses of the examples was determined by the average linear expansion coefficient at 100 to 300° C. according to Japanese Optical Glass Industrial Standard JOGIS 08-2003, "Method of Measuring Thermal Expansion of an Optical Glass".

The specific gravity of the glasses of the examples was measured based on Japanese Optical Glass Industrial Standard JOGIS 05-1975 "Measuring Method of Specific Gravity of Optical Glass".

Further, concerning the glasses of the examples, the presence or absence of devitrification and opacity before and after the reheating test (drop test) was confirmed by visual inspection. Herein, the confirmation of the presence or absence of devitrification and opacity before and after the reheating test was carried out by mounting a 15 mm×15 mm×30 mm test piece on a concave refractory body and inserting it into an electric furnace and reheating up to the reheating temperature, and after holding at this temperature for 30 min, cooling to normal temperature and removing it from the furnace, polishing two opposing faces to a thickness of 10 mm so that the inner portion can be observed, and then visually observing the presence or absence of devitrification and opacity in the polished glass test piece. At this time, for glasses where devitrification and opacity did not arise when the reheating temperature of the test piece was held at (At +80° C. to 130° C.), and further, where devitrification and opacity did not arise when the reheating temperature of a separate test piece was held at (At +more than 130° C. to 150° C.), the "drop test" was evaluated as "0". Further, for glasses where devitrification and opacity did not arise when the reheating temperature of the test piece was held at (At +80° C. to 130° C.), but devitrification or opacity did arise when the reheating temperature of a separate test piece was held at (At+more than 130° C. to 150° C.), the "drop test" was evaluated as "Δ". Further, for glasses where devitrification or opacity did arise when the reheating temperature of the test piece was held at (At +80° C. to 90° C.), the "drop test" was evaluated as "x".

TABLE 1

|  | Examples | | | | | | | |
| --- | --- | --- | --- | --- | --- | --- | --- | --- |
| (Unit: mol %) | 1 | 2 | 3 | 4 | 5 | 6 | 7 | 8 |
| $SiO_2$ | 48.02 | 52.94 | 45.05 | 49.02 | 49.02 | 53.98 | 53.98 | 53.45 |
| $Nb_2O_5$ | 8.85 | 8.34 | 8.30 | 9.03 | 9.03 | 8.50 | 8.50 | 8.42 |
| $Na_2O$ | 18.34 | 17.28 | 13.23 | 18.72 | 22.89 | 17.62 | 19.58 | 17.45 |
| $Li_2O$ | 2.04 |  | 8.24 | 4.17 |  | 1.96 |  | 0.97 |
| $B_2O_3$ | 17.58 | 12.72 | 16.50 | 17.95 | 17.95 | 12.97 | 12.97 | 12.84 |
| $ZrO_2$ | 5.14 | 8.69 | 8.65 | 1.08 | 1.08 | 4.94 | 4.94 | 6.83 |
| $Sb_2O_3$ | 0.03 | 0.03 | 0.03 | 0.03 | 0.03 | 0.03 | 0.03 | 0.03 |
| Total | 100.0 | 100.0 | 100.0 | 100.0 | 100.0 | 100.0 | 100.0 | 100.0 |
| Si + Nb + Li | 58.91 | 61.28 | 61.59 | 62.22 | 58.05 | 64.44 | 62.48 | 62.84 |
| Si/(Si + B) | 0.73 | 0.81 | 0.73 | 0.73 | 0.73 | 0.81 | 0.81 | 0.81 |
| Li + Na + K | 20.38 | 17.28 | 21.47 | 22.89 | 22.89 | 19.58 | 19.58 | 18.42 |
| (Li + Na)/Rn | 1.00 | 1.00 | 1.00 | 1.00 | 1.00 | 1.00 | 1.00 | 1.00 |
| Mg + Ca + Sr + Ba | 0.00 | 0.00 | 0.00 | 0.00 | 0.00 | 0.00 | 0.00 | 0.00 |
| La + Gd + Y + Yb | 0.00 | 0.00 | 0.00 | 0.00 | 0.00 | 0.00 | 0.00 | 0.00 |
| Refractive index ($n_d$) | 1.665 | 1.669 | 1.685 | 1.653 | 1.646 | 1.660 | 1.656 | 1.664 |
| Abbe number ($v_d$) | 35.7 | 35.3 | 35.7 | 37.2 | 37.4 | 36.3 | 36.3 | 35.8 |
| Intercept b (a = 0.012) | 2.09 | 2.09 | 2.11 | 2.10 | 2.09 | 2.09 | 2.09 | 2.09 |
| Partial dispersion ratio (θg, F) | 0.582 | 0.582 | 0.581 | 0.579 | 0.579 | 0.581 | 0.580 | 0.581 |
| Intercept b' (a' = 0.00162) | 0.640 | 0.639 | 0.638 | 0.639 | 0.639 | 0.639 | 0.639 | 0.639 |
| Specific gravity | 2.96 | 3.00 | 3.03 | 2.92 | 2.92 | 2.96 | 2.96 | 2.98 |
| Glass transition point Tg [° C.] | 544 | 586 | 526 | 530 | 561 | 561 | 563 | 574 |
| Yield point At [° C.] | 603 | 652 | 584 | 588 | 621 | 628 | 625 | 640 |
| Average coefficient of linear expansion (α) | 91 | 77 | 88 | 95 | 96 | 85 | 89 | 81 |
| Drop test | ○ | ○ | ○ | ○ | ○ | ○ | ○ | ○ |

TABLE 2

|  | Examples | |
| --- | --- | --- |
| (Unit: mol %) | 9 | 10 |
| $SiO_2$ | 40.69 | 44.85 |
| $Nb_2O_5$ | 9.03 | 9.03 |
| $Na_2O$ | 22.89 | 18.72 |
| $Li_2O$ |  |  |
| $B_2O_3$ | 17.95 | 17.95 |
| $ZrO_2$ | 9.42 | 9.42 |
| $Sb_2O_3$ | 0.03 | 0.03 |
| Total | 100.0 | 100.0 |
| Si + Nb + Li | 49.72 | 53.89 |
| Si/(Si + B) | 0.69 | 0.71 |
| Li + Na + K | 22.89 | 18.72 |
| (Li + Na)/Rn | 1.00 | 1.00 |
| Mg + Ca + Sr + Ba | 0.00 | 0.00 |
| La + Gd + Y + Yb | 0.00 | 0.00 |
| Refractive index ($n_d$) | 1.685 | 1.681 |
| Abbe number ($v_d$) | 34.5 | 34.4 |
| Intercept b (a = 0.012) | 2.10 | 2.09 |
| Partial dispersion ratio (θg, F) | 0.583 | 0.584 |
| Intercept b' (a' = 0.00162) | 0.639 | 0.640 |
| Specific gravity | 3.07 | 3.03 |

TABLE 2-continued

| (Unit: mol %) | Examples | |
|---|---|---|
| | 9 | 10 |
| Glass transition point Tg [° C] | 566 | 564 |
| Yield point At [° C] | 625 | 625 |
| Average coefficient of linear expansion (α) | 85 | 84 |
| Drop test | Δ | x |

TABLE 3

| (Unit: mol %) | Examples | | | | | | | |
|---|---|---|---|---|---|---|---|---|
| | 11 | 12 | 13 | 14 | 15 | 16 | 17 | 18 |
| $SiO_2$ | 55.00 | 60.00 | 53.00 | 49.00 | 40.00 | 53.50 | 52.38 | 52.38 |
| $Nb_2O_5$ | 8.00 | 7.11 | 8.00 | 9.00 | 12.77 | 8.50 | 8.25 | 8.25 |
| $Na_2O$ | 17.20 | 15.29 | 20.00 | 27.00 | 17.23 | 10.00 | 17.10 | 17.10 |
| $Li_2O$ | 1.00 | 0.89 | 1.00 | 1.00 | 6.00 | 7.57 | 0.95 | 0.95 |
| $B_2O_3$ | 12.00 | 10.67 | 12.00 | 8.52 | 15.32 | 13.04 | 12.58 | 12.58 |
| $ZrO_2$ | 6.77 | 6.02 | 5.97 | 5.45 | 8.64 | 7.36 | 6.69 | 6.69 |
| $K_2O$ | | | | | | | | |
| MgO | | | | | | | | |
| CaO | | | | | | | | |
| SrO | | | | | | | | |
| BaO | | | | | | | | |
| $La_2O_3$ | | | | | | | | |
| $P_2O_5$ | | | | | | | 2.00 | |
| $Al_2O_3$ | | | | | | | | 2.00 |
| $Ta_2O_5$ | | | | | | | | |
| ZnO | | | | | | | | |
| $Sb_2O_3$ | 0.03 | 0.03 | 0.03 | 0.03 | 0.04 | 0.03 | 0.03 | 0.03 |
| Total | 100.0 | 100.0 | 100.0 | 100.0 | 100.0 | 100.0 | 100.0 | 100.0 |
| Si + Nb + Li | 64.00 | 68.00 | 62.00 | 59.00 | 58.77 | 69.57 | 61.58 | 61.58 |
| Si/(Si + B) | 0.82 | 0.85 | 0.82 | 0.85 | 0.72 | 0.80 | 0.81 | 0.81 |
| Li + Na + K | 18.20 | 16.18 | 21.00 | 28.00 | 23.23 | 17.57 | 18.05 | 18.05 |
| (Li + Na)/Rn | 1.00 | 1.00 | 1.00 | 1.00 | 1.00 | 1.00 | 1.00 | 1.00 |
| Mg + Ca + Sr + Ba | 0.00 | 0.00 | 0.00 | 0.00 | 0.00 | 0.00 | 0.00 | 0.00 |
| La + Cd + Y + Yb | 0.00 | 0.00 | 0.00 | 0.00 | 0.00 | 0.00 | 0.00 | 0.00 |
| Refractive index ($n_d$) | 1.664 | 1.639 | 1.658 | 1.671 | 1.742 | 1.677 | 1.656 | 1.657 |
| Abbe number ($v_d$) | 36.0 | 37.8 | 36.9 | 36.1 | 30.6 | 35.4 | 36.2 | 35.9 |
| Intercept b (a = 0.012) | 2.10 | 2.09 | 2.10 | 2.10 | 2.11 | 2.10 | 2.09 | 2.09 |
| Partial dispersion ratio (θg, F) | 0.583 | 0.574 | 0.581 | 0.581 | 0.592 | 0.588 | 0.592 | 0.579 |
| Intercept b' (a' = 0.00162) | 0.641 | 0.635 | 0.641 | 0.640 | 0.642 | 0.645 | 0.651 | 0.637 |
| Specific gravity | 3.22 | 2.90 | 2.99 | 3.07 | 3.22 | 2.98 | 2.95 | 2.95 |
| Glass transition point Tg [° C.] | 621 | 585 | 581 | 578 | 535 | 540 | 619 | 568 |
| Yield point At [° C.] | 699 | 655 | 647 | 641 | 589 | 600 | 635 | 616 |
| Average coefficient of linear expansion (α) [× $10^{-7}$ $K^{-1}$] | 77 | 76 | 88 | 108 | 91 | 73 | 79 | 80 |
| Drop test | | | | | | | | |

TABLE 4

| (Unit: mol %) | Examples | | | | | | | |
|---|---|---|---|---|---|---|---|---|
| | 19 | 20 | 21 | 22 | 23 | 24 | 25 | 26 |
| $SiO_2$ | 52.38 | 52.38 | 52.38 | 52.38 | 52.38 | 52.38 | 52.38 | 52.38 |
| $Nb_2O_5$ | 8.25 | 8.25 | 8.25 | 8.25 | 8.25 | 8.25 | 8.25 | 8.25 |
| $Na_2O$ | 17.10 | 17.10 | 17.10 | 17.10 | 17.10 | 17.10 | 17.10 | 19.10 |
| $Li_2O$ | 0.95 | 0.95 | 0.95 | 0.95 | 0.95 | 0.95 | 0.95 | 0.95 |
| $B_2O_3$ | 12.58 | 12.58 | 12.58 | 12.58 | 12.58 | 12.58 | 12.58 | 12.58 |
| $ZrO_2$ | 6.69 | 6.69 | 6.69 | 6.69 | 6.69 | 6.69 | 6.69 | 6.69 |
| $K_2O$ | | | | | | | | |
| MgO | | | | 2.00 | | | | |
| CaO | | | | | 2.00 | | | |
| SrO | | | | | | 2.00 | | |

TABLE 4-continued

| (Unit: mol %) | Examples | | | | | | | |
|---|---|---|---|---|---|---|---|---|
| | 19 | 20 | 21 | 22 | 23 | 24 | 25 | 26 |
| BaO | | | | | | | 2.00 | |
| $La_2O_3$ | 2.00 | | | | | | | |
| $P_2O_5$ | | | | | | | | |
| $Al_2O_3$ | | | | | | | | |
| $Ta_2O_5$ | | 2.00 | | | | | | |
| ZnO | | | 2.00 | | | | | |
| $Sb_2O_3$ | 0.03 | 0.03 | 0.03 | 0.03 | 0.03 | 0.03 | 0.03 | 0.03 |
| Total | 100.0 | 100.0 | 100.0 | 100.0 | 100.0 | 100.0 | 100.0 | 100.0 |
| Si + Nb + Li | 61.58 | 61.58 | 61.58 | 61.58 | 61.58 | 61.58 | 61.58 | 61.58 |
| Si/(Si + B) | 0.81 | 0.81 | 0.81 | 0.81 | 0.81 | 0.81 | 0.81 | 0.81 |
| Li + Na + K | 18.05 | 18.05 | 18.05 | 18.05 | 18.05 | 18.05 | 18.05 | 20.05 |
| (Li + Na)/Rn | 1.00 | 1.00 | 1.00 | 1.00 | 1.00 | 1.00 | 1.00 | 1.00 |
| Mg + Ca + Sr + Ba | 0.00 | 0.00 | 0.00 | 2.00 | 2.00 | 2.00 | 2.00 | 0.00 |
| La + Gd + Y + Yb | 2.00 | 0.00 | 0.00 | 0.00 | 0.00 | 0.00 | 0.00 | 0.00 |
| Refractive index ($n_d$) | 1.686 | 1.692 | 1.667 | 1.665 | 1.667 | 1.675 | 1.676 | 1.670 |
| Abbe number ($v_d$) | 36.2 | 33.7 | 35.7 | 36.1 | 36.2 | 36.0 | 35.8 | 35.9 |
| Intercept b (a = 0.012) | 2.12 | 2.10 | 2.10 | 2.10 | 2.10 | 2.11 | 2.11 | 2.10 |
| Partial dispersion ratio ($\theta g, F$) | 0.586 | 0.586 | 0.579 | 0.581 | 0.580 | 0.586 | 0.579 | 0.587 |
| Intercept b' (a' = 0.00162) | 0.645 | 0.641 | 0.637 | 0.640 | 0.638 | 0.644 | 0.637 | 0.645 |
| Specific gravity | 3.18 | 3.21 | 3.02 | 2.99 | 3.00 | 3.07 | 3.10 | 3.03 |
| Glass transition point Tg [° C.] | 586 | 586 | 561 | 572 | 578 | 579 | 581 | 575 |
| Yield point At [° C.] | 650 | 649 | 629 | 637 | 637 | 643 | 648 | 612 |
| Average coefficient of linear expansion ($\alpha$) [$\times 10^{-7}$ $K^{-1}$] | 79 | 70 | 80 | 78 | 82 | 75 | 71 | 79 |
| Drop test | | | | | | | | |

TABLE 5

| (Unit: mol %) | Examples | | |
|---|---|---|---|
| | 27 | 28 | 29 |
| $SiO_2$ | 52.38 | 53.38 | 53.19 |
| $Nb_2O_5$ | 8.25 | 8.25 | 8.72 |
| $Na_2O$ | 17.10 | 18.10 | 18.70 |
| $Li_2O$ | 0.95 | | 1.11 |
| $B_2O_3$ | 12.58 | 13.50 | 12.84 |
| $ZrO_2$ | 6.69 | 6.69 | 5.38 |
| $K_2O$ | 2.00 | | |
| MgO | | | |
| CaO | | | |
| SrO | | | |
| BaO | | | |
| $La_2O_3$ | | | |
| $P_2O_5$ | | | |
| $Al_2O_3$ | | | |
| $Ta_2O_5$ | | | |
| ZnO | | | |
| $Sb_2O_3$ | 0.03 | 0.07 | 0.06 |
| Total | 100.0 | 100.0 | 100.0 |
| Si + Nb + Li | 61.58 | 61.63 | 63.02 |
| Si/(Si + B) | 0.81 | 0.80 | 0.81 |
| Li + Na + K | 20.05 | 18.10 | 19.81 |
| (Li + Na)/Rn | 0.90 | 1.00 | 1.00 |
| Mg + Ca + Sr + Ba | 0.00 | 0.00 | 0.00 |
| La + Gd + Y + Yb | 0.00 | 0.00 | 0.00 |
| Refractive index ($n_d$) | 1.668 | 1.659 | 1.640 |
| Abbe number ($v_d$) | 36.0 | 36.0 | 40.3 |
| Intercept b (a = 0.012) | 2.10 | 2.09 | 2.12 |
| Partial dispersion ratio ($\theta g, F$) | 0.582 | 0.582 | 0.571 |
| Intercept b' (a' = 0.00162) | 0.641 | 0.640 | 0.636 |
| Specific gravity | 3.02 | 2.97 | 3.13 |
| Glass transition point Tg [° C.] | 569 | 583 | 595 |
| Yield point At [° C.] | 613 | 645 | 664 |
| Average coefficient of linear expansion ($\alpha$) [$\times 10^{-7}$ $K^{-1}$] | 81 | 79 | 84 |
| Drop test | | | |

According to these tables, the optical glasses of the Examples (No. 1 to No. 29) had a partial dispersion ratio ($\theta g, F$) of no greater than 0.594, which was within the desired range.

Figure 2:
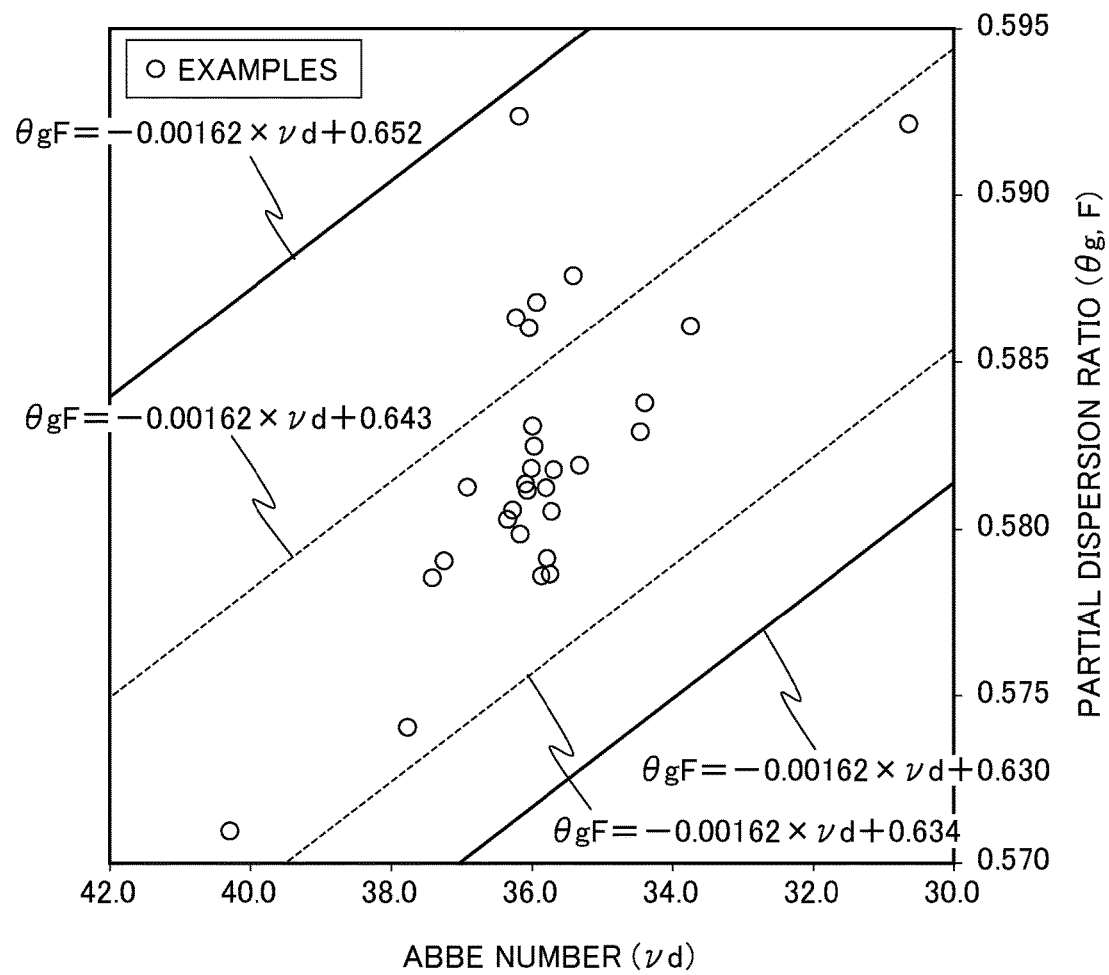
FIG. 2 is a drawing showing the relationship between the partial dispersion ratio (θg,F) and the Abbe number (vd) for examples of the present invention.

Herein, for the optical glass of the examples of the present invention, the partial dispersion ratio ($\theta g, F$) and the Abbe number (vd) satisfied the relationship $(-0.00162 \times vd + 0.630) \leq (\theta g, F) \leq (-0.00162 \times vd + 0.652)$, and more specifically, satisfied the relationship $(\theta g, F) \leq (-0.00162 \times vd + 0.651)$. Moreover, the relationship between the partial dispersion ratio ($\theta g, F$) and the Abbe number (vd) for the optical glasses of the examples of the present specification was as shown in FIG. 2.

Accordingly, it was clear that the optical glasses of the examples of the present invention had a small partial dispersion ratio ($\theta g, F$).

The optical glasses of the examples of the present invention all had a refractive index (nd) of no less than 1.62, and more specifically, no less than 1.64, and besides, these refractive indices (nd) were no greater than 1.75, and was within the desired range.

Further, the optical glasses of the examples of the present invention all had an Abbe number (vd) of no less than 30, and more specifically no less than 34, and besides, these Abbe numbers (vd) were no greater than 42, more specifically no greater than 41, and were within the desired range.

Figure 3:
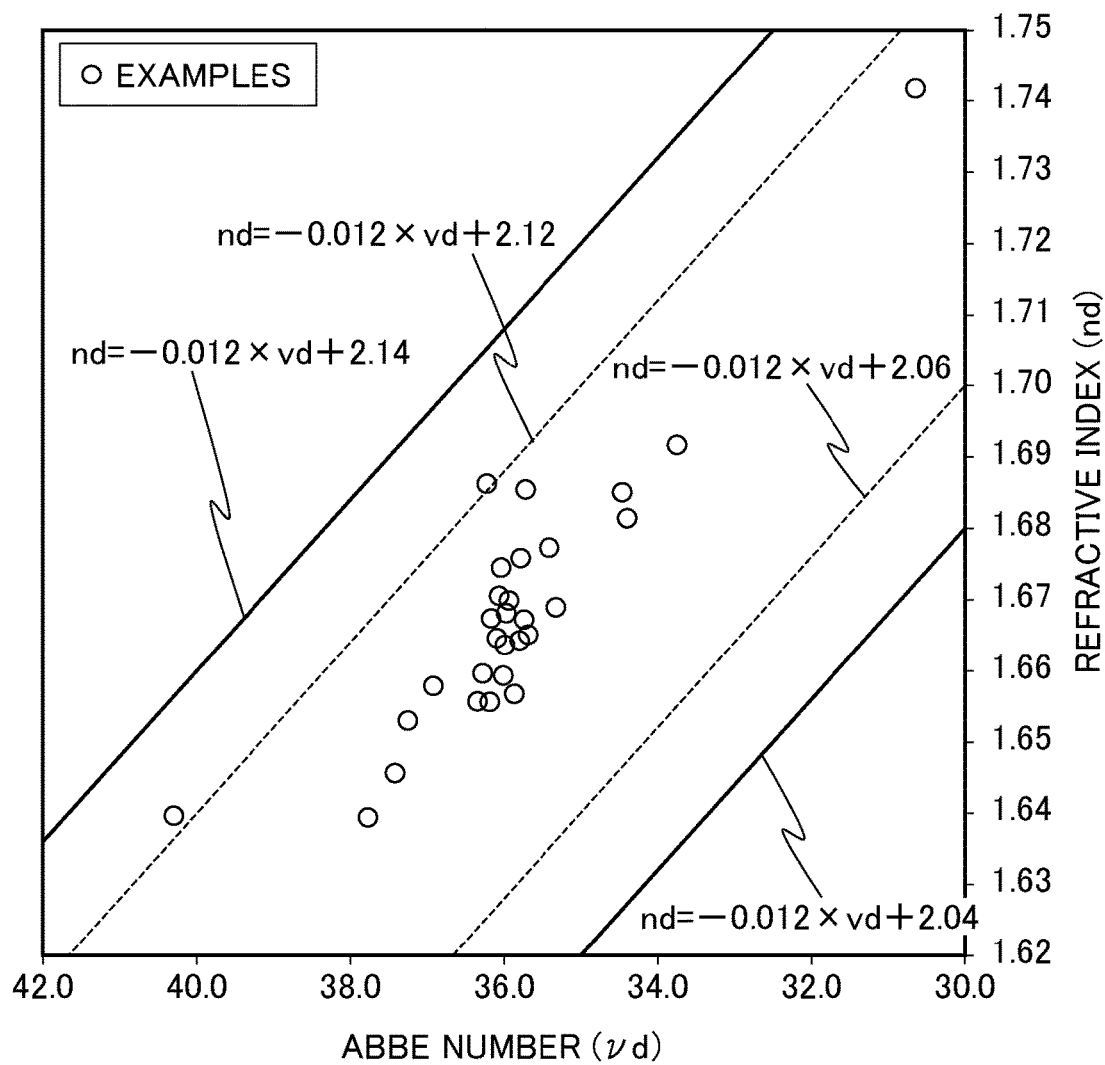
FIG. 3 is a drawing showing the relationship between the refractive index (nd) and the Abbe number (vd) for examples of the present invention.

Herein, for the optical glasses of the examples of the present invention, the refractive index (nd) and the Abbe number (vd) satisfied the relationship $(-0.012vd+2.04) \leq nd \leq (-0.012vd+2.14)$, and more specifically satisfied the relationship $(-0.012vd+2.08) \leq nd \leq (-0.012vd+2.13)$. Moreover, the relationship between the refractive index (nd) and the Abbe number (vd) for the glasses of the examples of the present invention were as shown in FIG. 3.

Accordingly, it was clear that the optical glasses of the examples are optical glasses which have a refractive index (nd) and an Abbe number (vd) within the desired ranges, and further, which have a low partial dispersion ratio ($\theta g,F$).

Among these, in particular for the optical glasses of the Examples (No. 1 to No. 8), the occurrence of devitrification and opacity were impeded both before and after carrying out the reheating test (drop test). On the other hand, for the optical glasses of the Examples (No. 9 to No. 10), devitrification and opacity did arise in at least a part of the temperature range among a temperature range of 80 to 150° C. higher than the yield point (At) of the test pieces. Accordingly, the optical glasses of the Examples (No. 1 to No. 8), compared to the optical glasses of the Examples (No. 9 to No. 10), impeded the occurrence of devitrification and opacity due to reheating, and can be surmised to have enhanced reheat press molding properties.

In addition, the optical glasses of the Examples all had a specific gravity of no greater than 3.50, more specifically no greater than 3.30, and were within the desired range.

Further, for the optical glasses of the Examples, the glass transition point was no greater than 650° C., more specifically no greater than 630° C. Further, the optical glasses of the examples all had a yield point of no greater than 700° C., and were within the desired range. In this way, it can be surmised that it is possible to mold press mold the glass at a lower temperature.

Further, the optical glasses of the Examples had an average coefficient of linear expansion (a) of no greater than 120×10-7 K-1, and more specifically no greater than 110× 10-7 K-1, and were within the desired range.

Further, when using the optical glasses of the Examples to form a lens preform, upon mold press molding these lens preforms, it was possible to process them into various lens forms without the occurrence of devitrification or opacity.

Above, the present invention was explained in detail with the objective of exemplification, but the present examples have only the objective of exemplification, and it is to be understood that one skilled in the art can make many modifications without departing from the concept or scope of the present invention.

What is claimed is:

1. An optical glass comprising, in mol %,
   40.00 to 65.0% of an $SiO_2$ component,
   1.0 to 9.03% of an $Nb_2O_5$ component,
   1.0 to 35.0% of an $Na_2O$ component,
   less than 9.0% of a $ZrO_2$ component, and
   less than 2.5% of a CaO component,
   and having
   a refractive index ($n_d$) of 1.62 to 1.75,
   an Abbe number ($v_d$) of 30 to 42, and
   a partial dispersion ratio ($\theta g,F$) of no greater than 0.594.

2. An optical glass according to claim 1, wherein a sum (in mol %) of ($SiO_2+Nb_2O_5+Li_2O$) is greater than 50.0% and no greater than 70.0%.

3. An optical glass according to claim 1, wherein, in mol %,
   a $B_2O_3$ component is 0 to 30.0%.

4. An optical glass according to claim 1, wherein, in mol %,
   an $Li_2O$ component is 0 to 20.0%,
   a $TiO_2$ component is 0 to 15.0%,
   a $K_2O$ component is 0 to 10.0%,
   an MgO component is 0 to 10.0%,
   an SrO component is 0 to 15.0%,
   a BaO component is 0 to 25.0%,
   an $La_2O_3$ component is 0 to 15.0%,
   a $Gd_2O_3$ component is 0 to 10.0%,
   a $Y_2O_3$ component is 0 to 20.0%,
   a $Yb_2O_3$ component is 0 to 10.0%,
   a $P_2O_5$ component is 0 to 10.0%,
   a $GeO_2$ component is 0 to 10.0%,
   an $Al_2O_3$ component is 0 to 15.0%,
   a $Ga_2O_3$ component is 0 to 10.0%,
   a $Ta_2O_5$ component is 0 to 10.0%,
   a $WO_3$ component is 0 to 10.0%,
   a $Bi_2O_3$ component is 0 to 10.0%,
   a ZnO component is 0 to 20.0%,
   a $TeO_2$ component is 0 to 10.0%,
   an $SnO_2$ component is 0 to 5.0%, and
   an $Sb_2O_3$ component is 0 to 1.0%.

5. An optical glass according to claim 1, wherein a mol ratio $(SiO_2)/(SiO_2+B_2O_3)$ is less than 0.95.

6. An optical glass according to claim 1, wherein a sum (in mol %) of an $Rn_2O$ component (in the formula, Rn is at least one selected from the group consisting of Li, Na, and K) is 5.0% to 40.0%.

7. An optical glass according to claim 1, wherein a sum (in mol %) of an RO component (in the formula, R is at least one selected from the group consisting of Mg, Ca, Sr, and Ba) is no greater than 25.0%, and
   a sum (in mol %) of an $Ln_2O_3$ component (in the formula, Ln is at least one selected from the group consisting of Y, La, Gd, and Yb) is no greater than 20.0%.

8. An optical glass according to claim 1, wherein a mol ratio of $(Li_2O+Na_2O)/(Rn_2O)$ is no less than 0.75.

9. An optical glass according to claim 1, wherein the refractive index ($n_d$) is 1.62 to 1.74, and the Abbe number ($v_d$) is 30 to 40.

10. A preform for use in a polishing process or precision press molding, consisting of the optical glass of claim 1.

11. An optical element consisting of the optical glass according to claim 1.

* * * * *